US010322881B1

(12) United States Patent
Manyam et al.

(10) Patent No.: US 10,322,881 B1
(45) Date of Patent: Jun. 18, 2019

(54) NOTIFYING USERS TO PROVIDE PICKED ITEMS TO A DROP OFF LOCATION FOR PROCESSING

(71) Applicant: Amazon Technologies, Inc., Seattle, WA (US)

(72) Inventors: Ohil Krishnamurthy Manyam, Bellevue, WA (US); Jon Robert Ducrou, Seattle, WA (US); Anamika Sinha, Seattle, WA (US); Long Xuan Nguyen, Seattle, WA (US); Daniel Buchmueller, Seattle, WA (US); Ramanathan Palaniappan, Issaquah, WA (US); Michel Leonard Goldstein, Seattle, WA (US); Raymond Wheekyun Lim, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/583,486

(22) Filed: Dec. 26, 2014

Related U.S. Application Data

(63) Continuation of application No. 14/109,696, filed on Dec. 17, 2013, now abandoned.

(51) Int. Cl.
  *G06F 7/00* (2006.01)
  *B65G 1/16* (2006.01)
  *G06N 5/04* (2006.01)

(52) U.S. Cl.
  CPC ............... *B65G 1/16* (2013.01); *G06N 5/048* (2013.01)

(58) Field of Classification Search
  None
  See application file for complete search history.

(56) References Cited

U.S. PATENT DOCUMENTS

| 5,696,689 | A | 12/1997 | Okumura et al. |
| 5,928,389 | A | 7/1999 | Jevtic |
| 5,946,662 | A | 8/1999 | Ettl et al. |
| 6,351,474 | B1 | 2/2002 | Robinett et al. |
| 6,795,823 | B1 | 9/2004 | Aklepi et al. |
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |

(Continued)

OTHER PUBLICATIONS

Yan et al., "Discrete Optimization: A heuristic approach for airport gate assignments for stochastic flight delays," European Journal of Operational Research 180(2007), pp. 547-567.

(Continued)

*Primary Examiner* — Yolanda R Cumbess
(74) *Attorney, Agent, or Firm* — Athorus, PLLC

(57) ABSTRACT

The application describes a system and process for anticipating when a user will leave a selection area within a materials handling facility and determining if a notification requesting that the user provide a tote of picked items to a drop off location should be presented to the user. For example, a user may be asked to provide items picked from a selection area for processing, such as packing, while the user is picking items from other selection areas of a materials handling facility.

22 Claims, 10 Drawing Sheets

(56) References Cited

U.S. PATENT DOCUMENTS

| | | |
|---|---|---|
| 8,688,598 B1 | 4/2014 | Shakes et al. |
| 8,744,608 B2 | 6/2014 | Ohishi et al. |
| 9,473,747 B2 | 10/2016 | Kobres et al. |
| 2002/0032613 A1 | 3/2002 | Buettgenbach et al. |
| 2003/0002712 A1 | 1/2003 | Steenburgh et al. |
| 2003/0083890 A1 | 5/2003 | Duncan et al. |
| 2004/0054549 A1 | 3/2004 | Chittenden et al. |
| 2004/0111279 A1 | 6/2004 | Schoen et al. |
| 2004/0181467 A1 | 9/2004 | Raiyani et al. |
| 2004/0230854 A1 | 11/2004 | Elko et al. |
| 2005/0149226 A1* | 7/2005 | Stevens et al. ...... B65G 1/1371 700/214 |
| 2006/0206235 A1* | 9/2006 | Shakes et al. ......... G06Q 10/08 700/216 |
| 2006/0242154 A1 | 10/2006 | Rawat et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2008/0183327 A1* | 7/2008 | Danelski ................ B65G 1/137 700/216 |
| 2008/0195241 A1 | 8/2008 | Lin et al. |
| 2009/0119142 A1 | 5/2009 | Yenni et al. |
| 2009/0121017 A1 | 5/2009 | Cato et al. |
| 2009/0245573 A1 | 10/2009 | Saptharishi et al. |
| 2010/0002270 A1 | 1/2010 | Suzuki |
| 2011/0011936 A1 | 1/2011 | Morandi et al. |
| 2011/0090078 A1 | 4/2011 | Kim et al. |
| 2011/0208560 A1 | 8/2011 | Najmi et al. |
| 2011/0320376 A1 | 12/2011 | Dearlove et al. |
| 2012/0026017 A1 | 2/2012 | Horstemeyer |
| 2012/0072011 A1 | 3/2012 | Sarma |
| 2012/0284132 A1 | 11/2012 | Kim et al. |
| 2013/0076898 A1 | 3/2013 | Philippe et al. |
| 2013/0226651 A1 | 8/2013 | Napper |
| 2013/0253700 A1 | 9/2013 | Carson et al. |
| 2014/0149269 A1 | 5/2014 | Kantarjiev et al. |
| 2014/0180468 A1 | 6/2014 | Winkler |
| 2014/0279294 A1 | 9/2014 | Field-Darragh et al. |
| 2014/0350715 A1* | 11/2014 | Gopalakrishnan et al. ................. G06Q 10/087 700/215 |
| 2015/0019391 A1 | 1/2015 | Kumar et al. |
| 2015/0073907 A1 | 3/2015 | Purves et al. |
| 2015/0127401 A1 | 5/2015 | Hogg et al. |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

NOTIFYING USERS TO PROVIDE PICKED ITEMS TO A DROP OFF LOCATION FOR PROCESSING

PRIORITY CLAIMS

The present application is a continuation of U.S. application Ser. No. 14/109,696, filed Dec. 17, 2013 entitled "Notifying User To Provide Picked Items To A Drop Off Location For Processing," the disclosure of which is hereby incorporated by reference.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers, that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
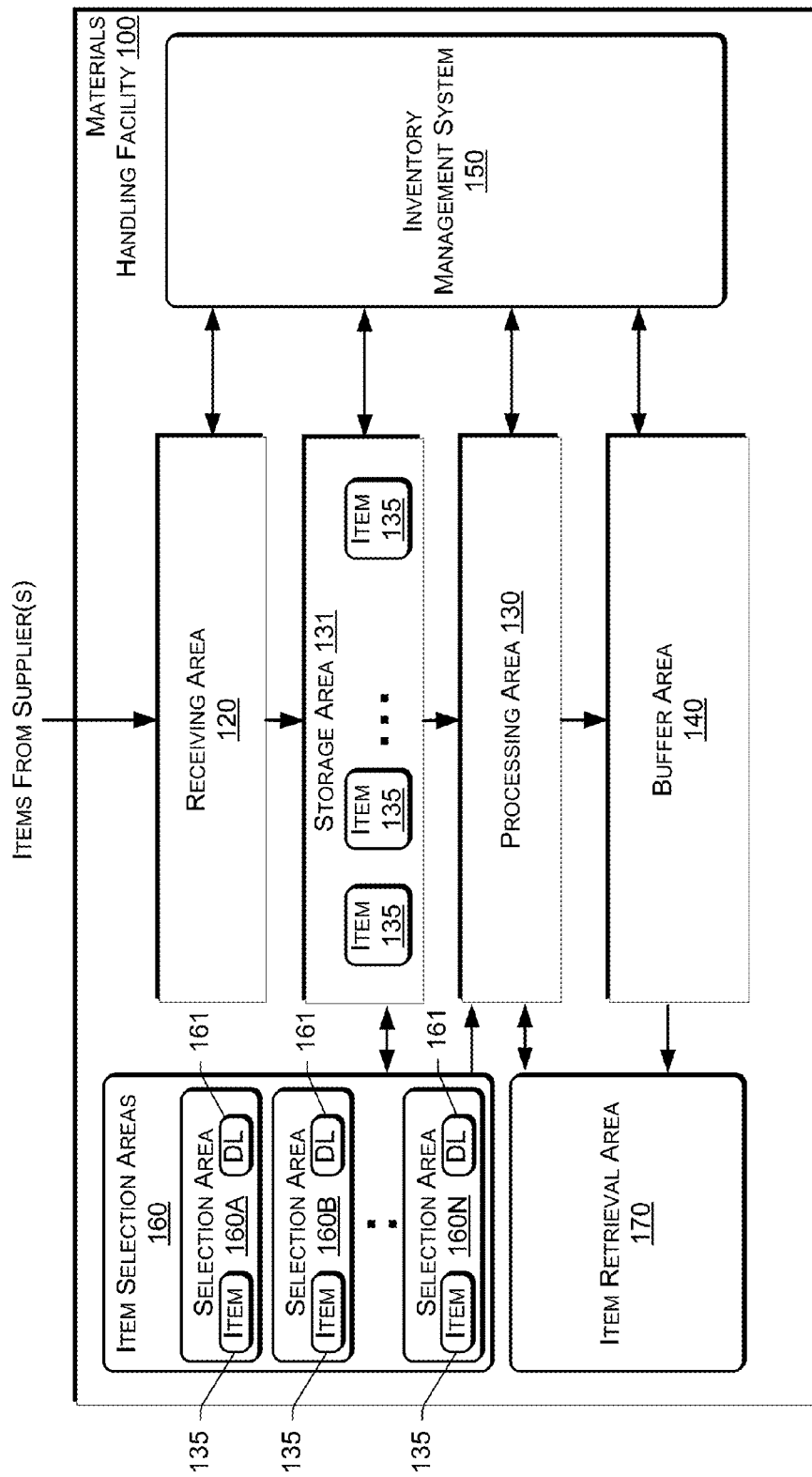
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including" and "includes" mean including, but not limited to.

DETAILED DESCRIPTION

This disclosure describes a system for determining when a user located in a materials handling facility is leaving an item selection area and recommending that the user leave a tote of picked items at a drop off location for processing by agents of the materials handling facility. For example, if a user is in an item selection area of the materials handling facility picking items, the implementations described herein may determine when the user is leaving the item selection area. Upon detecting the pending departure of the user from the user selection area, if the user has not already provided the picked items to an agent, a drop off location physically near the user may be determined and a recommendation provided to the user that they provide the picked items to the drop off location. Picked items left at a drop off location may be processed by one or more agents of the materials handling facility and made available to the user when the user is transitioning from the materials handling facility. For example, the picked items may be packed into one or more totes by agents of the materials handling facility and made available to the user for retrieval as the user is leaving the materials handling facility.

In some implementations, a determination may be made identifying an anticipated time until user departure for the user from the materials handling facility. For example, as a user progresses through a materials handling facility picking items, the implementations described herein may determine, based on a user profile associated with the user, items picked by the user, items not picked by the user, time of day, and other factors, and determine an anticipated time until user departure for the user. This information may be used to determine a time remaining to pack items picked by the user (referred to herein as a buffer difference), what additional items may be picked by the user, to transition picked items that have been processed by agents of the materials handling facility from a buffer area to a retrieval area so that they can be retrieved by the user as the user transitions from the materials handling facility, etc.

In some implementations, rather than immediately processing items picked by the user and provided for processing by agents of the materials handling facility, processing of multiple items from different users may be prioritized or sequenced based on the buffer difference. For example, if there are three users located in the materials handling facility that have provided picked items for processing by agents of the materials handling facility, an estimated processing time required to complete processing of the items picked by each user may be determined, an estimated time until departure of the user from the materials handling facility for each user may be determined and the difference between the times (buffer difference) may be utilized to sequence the processing of the items by agents of the materials handling facility.

For example, assume for discussion purposes that user A has picked 5 items, user B has picked 10 items, and user C has picked 35 items. Assuming it takes approximately one minute to complete processing on each item, the estimated additional processing times are 5 minutes for user A, 10 minutes for user B, and 35 minutes for user C. Further, assume that it is determined that the estimated time until departure for each of users A, B, and C is 40 minutes. Based on this information, it can be determined that processing of user C's picked items should be prioritized because it will take approximately 35 minutes to complete the processing of all 35 of the picked items (leaving only 5 minutes before the estimated departure of the user). Likewise, processing of user B's order should begin second and processing of user A's order should begin third. While this is a simple example with all processing times for each order being considered equal, in some implementations, as discussed below, the processing times may vary for each item picked by a user.

In some implementations, arrival of the user at a materials handling facility may be detected. For example, if the identity of the user is known, the license plate of the user's car is known, and/or other identifying information is known, the arrival of the user at the materials handling facility may be detected. Upon detecting the arrival, an item retrieval location may be determined for the user. The item retrieval location may be a stationary or movable location to which picked and processed items may be made available to the user as the user transitions from the materials handling facility. Continuing with the above example, the five items picked by user A may be processed (e.g., packed) into a single tote and that tote may be available at a retrieval area near the user's car for retrieval by the user as the user transitions from the materials handling facility.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to fulfill items selected by a user is illustrated in FIG. 1. As shown, a materials handling facility 100 includes a receiving area 120, a storage area 131 configured to store an arbitrary number of inventory items 135, a processing area 130 configured to enable processing of items 135 picked or otherwise selected by a user, and one or more buffer areas 140 configured to temporarily hold items that have been picked, ordered, or otherwise selected by a user and processed in the processing area 130. The materials handling facility may also include an item selection area 160 which may include one or more separate selection areas 160A-160N and an item retrieval area 170. In some implementations, each selection area 160A-160N may also include one or more drop off 161 locations configured to allow a user to provide one or more picked items and/or totes containing picked items for processing by an agent at the processing area. As discussed in further detail below, picked items provided at a drop off location may be transitioned to the processing area 130 for processing (e.g., packing) by one or more agents of the materials handling facility. The drop off location may be, for example, a physical location in the materials handling facility 100 where a user may position an item or a tote containing an item, a conveyor onto which one or more items and/or a tote of one or more items may be placed, a human agent of the materials handling facility that will receive a picked item from the user and transition the item to the processing area 130, a mobile drive unit that is configured to receive an item and/or a tote containing an item from the user and transition the item to the processing area 130, or any combination thereof. Drop off locations may be at fixed locations within the selection area 160A-160N at fixed locations outside of selection areas, and/or may be mobile. For example, if the drop off location is a human agent or mobile drive unit, the human agent or mobile drive unit may move around the selection area 160A-160N retrieving picked items from users so that the users can continue picking additional items without having to carry the already picked items, or handle a tote that includes already picked items.

The arrangement of the various areas within materials handling facility 100 is depicted functionally rather than schematically. For example, in some implementations, multiple different receiving areas 120, storage areas 131, processing areas 130, buffer areas 140, item selection areas 160, and/or item retrieval areas 170 may be interspersed rather than segregated. Likewise, one or more of the areas may be combined. For example, the item selection area 160 and the item retrieval area 170 may be combined into a single area.

Additionally, the materials handling facility 100 includes an inventory management system 150 configured to interact with each of receiving area 120, processing area 130, storage area 131, buffer area 140, item selection area 160, drop off locations 161, item retrieval area 170, totes and/or users within the materials handling facility 100.

The materials handling facility 100 may be configured to receive different kinds of inventory items 135 from various suppliers and to store them until a user orders, picks or otherwise selects one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 131 and/or in different selection areas 160A-160N of the item selection area 160. In some implementations, like items 135 may be stored or displayed together in bins, on shelves or via any other suitable storage mechanisms, such that all items 135 of a given kind are stored in one inventory location within the storage area 131 and/or within one selection area 160A-160N within the item selection area 160. In other implementations, like items 135 may be stored in different locations and/or in different selection areas 160A-160N. For example, to optimize retrieval or presentation of certain items 135 having high turnover, those items 135 may be stored in several different inventory locations and/or selection areas 160A-160N to reduce congestion that might occur at a single point of storage. In some implementations, some items may also be stored and accessible for retrieval by a user within the item retrieval area 170. The inventory management system 150 may maintain a mapping or location information identifying where within the materials handling facility each item is stored. Each inventory item may be associated with the corresponding location in which it is stored and the association may be maintained in an inventory data store 915 (FIG. 9) accessible by the inventory management system 150.

When an order or other selection of items 135 is received, or as a user progresses through the materials handling facility 100, the corresponding items 135 may be selected or "picked" from inventory locations within the storage area 131 and/or within the item selection area 160. For example, in one implementation, a user may have a list of items to pick and may progress through the selection area 160A picking items 135 from the inventory locations within the selection area 160A. In other implementations, materials handling facility employees and/or mobile drive units may pick items 135 from inventory locations within the storage area 131 using written or electronic pick lists derived from customer orders. In still other implementations, a user may interact with the inventory management system 150 via an interface at the item selection area 160 and select one or more items. The selected items may be picked from an inventory location of the storage area 131 (e.g., by an agent or mobile drive unit), delivered to processing area 130 for additional processing, temporarily held in the buffer area 140 and then made available for retrieval by the user at the item retrieval area 170.

As discussed in more detail below, a user may pick or otherwise select items while in the materials handling facility 100 and/or order items for retrieval from the materials handling facility 100. In some instances, an order may be a recurring order for items established by the user. A recurring order may be any order for items that happens automatically. For example, a user may establish an order for items that are picked and made available to the user each time the user arrives at the materials handling facility or as the user is departing the materials handling facility 100.

While in the materials handling facility 100, the user may participate in a picking process, picking one or more items that the user desires to remove from the materials handling facility. For example, the user may be picking items for purchase, rental, and/or to borrow that the user desires to take with them when they leave the materials handling facility. As the user picks the item(s) from within a selection area 160A-160N, the identification of the items may be added to a picked item list and associated with the user. If the user is using a tote, the tote may also be associated with the user and, if the item is placed in the tote, the item may be associated with the tote. A "tote," as used herein, may be any type of container into or onto which items may by placed. For example, a tote may be a wheeled cart, hand-carried cart, a bag, a box, a satchel, etc.

As the user prepares to leave a selection area 160A-160N, to either transition out of the materials handling area or to enter another selection area 160A-160N, the user may provide the picked items and/or the tote containing the picked items to a drop off location 161. For example, one of the selection areas, such as selection area 160A may include items of a first type (e.g., produce) and a different selection area, such as selection area 160B, may include items of a different type (e.g., cleaning supplies). A user may pick items of the first type from selection area 160A and drop off the picked items at a drop off location as they exit the first selection area 160A. The user may then proceed to the next selection area 160B and pick additional items. In some implementations, as discussed further below, the inventory management system 150 may determine when the user is about to move out of a selection area 160, such as selection area 160A, and provide a notification to the user to provide the picked items to a drop off location, if they have not already done so. For example, if the user is picking items identified on a pick list, once the user has picked the last item in selection area 160A included on the pick list, the inventory management system may present a notification to the user reminding them to provide their items to a drop off location and provide guidance to the nearest drop off location. Alternatively, if the drop off location is mobile (e.g., a human agent, mobile drive unit), the inventory management system may notify the drop off location that the user is exiting the selection area 160A, provide the location of the user to the drop off location, and instruct the drop off location to retrieve the picked items from the user as they exit the selection area 160A.

The association between the items, tote and user of picked items placed at a drop off location are maintained and the items are transitioned to the processing area 130 for processing by one or more agents of the materials handling facility 100. Continuing with the above example, while the user is picking additional items in selection area 160B, the items picked by the user while in selection area 160A that were provided to the drop off location 161 may be consolidated with other items picked, selected and/or ordered by the user, packed and temporarily stored in the buffer area 140. In some implementations, as discussed in further detail below, the inventory management system 150 may determine an estimated needed processing time for the picked items that have been transitioned to the processing area 130 and determine an estimated time until user departure of the user from the materials handling facility. This may be done for multiple users within the materials handling facility. Processing may include, for example, packing items into totes for retrieval by the user when the user leaves the materials handling facility, assembly of selected items, gift wrapping of items, etc.

Based on the estimated needed processing time and estimated time until user departure for each user within the materials handling facility, the inventory management system 150 may update a processing sequence to prioritize processing of items that have the smallest difference between the estimated needed processing time and the estimated time until user departure of the user associated with those items. This may be done in a recurring manner, with estimated needed processing times and estimated time until user departure times being periodically updated based on the activities of users within the materials handling facility. For example, if the user picks additional items that are provided to another drop off location, the estimated processing time may be increased to account for those additional items. Likewise, if the user stops to talk with another user, read a magazine, go to the restroom, etc., the estimated time until user departure may be likewise updated. By updating the processing sequence, items are processed in a manner so that they are available to the user at the item retrieval area 170 when the user is ready to transition from the materials handling facility 100.

In another implementation, the item selection area 160, in addition to including items that may be physically picked by the user, may also allow a user to communicate with the inventory management system 150, receive information about items 135 and/or select items 135 that the user desires to remove from the materials handling facility. For example, the item selection area 160 may include a touch-based display configured to present item information to a user and receive selections of items from the user. In response to receiving an item selection from a user (e.g., from the display), the inventory management system 150 may instruct a mobile drive unit or an agent to retrieve the selected item from the storage area 131 and provide the item to the processing area 130 for consolidation with other items picked by the user. The user may then retrieve the item at the item retrieval area 170.

Figure 2:
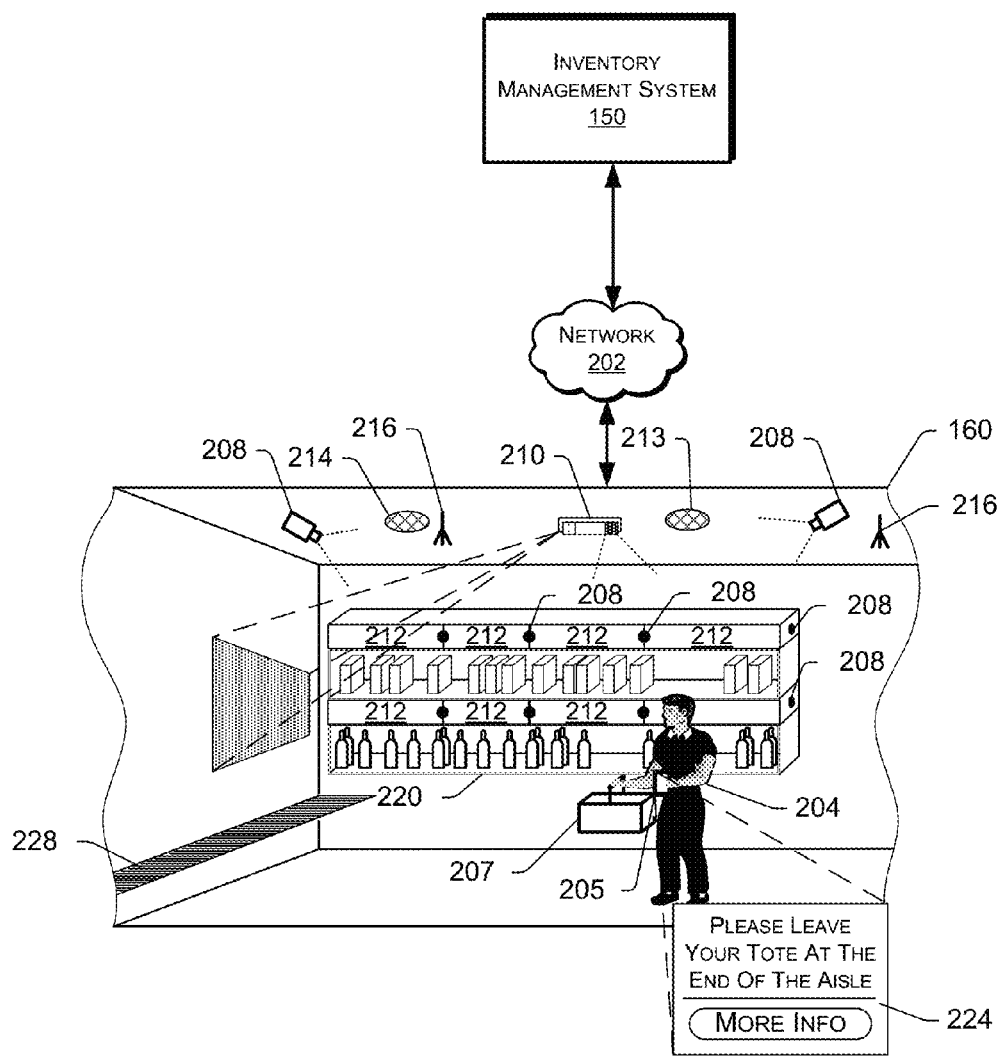
FIG. 2 is a block diagram illustrating additional details of a materials handling facility, according to some implementations.

FIG. 2 shows additional components of the item selection area 160 of the materials handling facility 100, according to some implementations. Generally, the item selection area 160 may include one or more image capture devices, such as cameras 208. For example, one or more cameras 208 may be positioned in locations of the materials handling facility 100 so that images of items and/or users within the item selection area 160 of the materials handling facility can be captured. In some implementations, the image capture devices 208 may be positioned overhead, such as on the ceiling to capture images of users, locations within the materials handling facility and/or items within the materials handling facility. In addition, in some implementations, one or more cameras 208 may be positioned on and/or inside of inventory locations 220. For example, a series of cameras 208 may be positioned on external portions of the inventory locations 220 and positioned to capture images of users, the location surrounding the inventory location 220 and/or items as they are placed into the inventory location or removed from the inventory location. Likewise, one or more cameras 208 may be positioned within the inventory locations 220 to capture images of items stored in the inventory locations 220 and/or images of objects (e.g., items, hands) moving into and/or out of the inventory locations 220.

Any type of camera and/or configuration of cameras may be used with the implementations described herein. For example, one or more of the cameras may be RGB cameras. In other implementations, one or more of the cameras may be depth sensing cameras.

In addition to cameras, other input devices, such as pressure sensors, infrared sensors, scales, load cells, volume displacement sensors, light curtains, active tag readers (e.g., radio frequency identifier ("RFID") tag scanner), visual code readers (e.g., barcode reader, bokode reader, QR code reader), etc., may be utilized with the implementations described herein. For example, pressure sensors, load cells and/or scales may be used to detect when an item is added to and/or removed from inventory locations. Likewise, an infrared sensor may be used to distinguish between a user's hand and inventory items. In still other implementations, a visual code or tag may be located on the items such that the items can be identified by a visual code reader.

In some implementations, a user may pick an item 135 from an inventory location and the inventory management system will capture and process images of the user picking the item. The processed images may be used to both identify the user that picked the item as well as identify the picked item. Likewise, based on knowledge of where items are located within the materials handling facility, the processed images may be used to determine the position from which the item was picked. Based on the determined position, the inventory management system 150 can query the inventory data store 915 (FIG. 9) to determine the item that was picked. For example, if the materials handling facility includes a selection area that contains produce items (e.g., fruits, vegetables), the user may pick items from the selection area and place them in a tote 207. As each item is picked, the captured images may be processed to identify the item and the user that picked the item. Once identified, the item is associated with the user and, optionally, the tote 207. When the user is done picking items from the selection area that contains produce, the user may provide the tote 207 to a drop off location 228 so that the items can be processed (e.g., packed) in the processing area while the user picks items from other selection areas within the materials handling facility.

In some implementations, totes 207 may include one or more active and/or visual tags that uniquely identify the tote and that are detectable by the inventory management system 150. When a user selects or is provided with a tote 207, the active and/or visual tag of the tote is identified by the inventory management system 150 and the tote is associated with the user. When the user provides the tote 207 to a drop off location, the association between the user and the tote remains so that all of the items included in the tote remain associated with the user. If the items are removed from the tote and placed in a different tote (e.g., for consolidation, packing), the tote into which the items are placed is associated with the items and the user. When a tote is emptied, the association between the user and the tote (and the items and the tote) may be terminated so that the tote can be reused by the same or different users within the materials handling facility.

In instances where the user 204 provides an item directly to a drop off location 228, the association between the user and the item may be maintained. If the item is later added to a tote (e.g., by an agent during processing), the tote is associated with the user. By maintaining an association between the user and the tote containing a user selected item(s) and/or between the user and the item(s) picked by the user, when the item(s) is made available to and retrieved by the user from the retrieval area, it is the same item(s) picked by the user while in the selection area.

In some implementations, rather than physically picking an item, the user may select an item through interaction with one or more input devices located within the item selection area. For example, a display 212 may be a touch based display that provides selection information to the user allowing the user to select items that the user desires to remove from the inventory location. In other implementations, one or more image capture devices, such as cameras 208, may capture images of the user and/or the selected items. Those images may be processed by the inventory management system 150 to identify the user and to determine the item selected by the user. Once the item is identified, the item may be picked by an agent or a mobile drive unit from an inventory location in the storage area. The picked item is associated with the user and transitioned to the processing area, for additional processing. This may include consolidating the picked item with other items picked by the user, packing, etc. Upon completion of processing, the item is transitioned to the buffer area and then made available in the retrieval area for retrieval by the user.

In some implementations, a user 204 located in the materials handling facility 100 may possess a portable device 205 and obtain information about items 135 located within the materials handling facility 100 via the portable device and/or select items 135 that the user desires to remove from the materials handling facility 100. Likewise, the portable device may be utilized to provide notifications to the user to provide the tote and/or picked items to a drop off location as they leave a selection area, or to provide the user with guidance to a drop off location.

Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc., to facilitate communication between the inventory management system 150 and the user 204. For example, notifications and/or item information may be presented to the user via one or more of the output devices (e.g., projector, display, speaker). In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150, the portable device 205 and the input/output devices. The inventory management system 150 may also include one or more computing resource(s) 203 (FIG. 4) that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case for processing items picked by a user within the item selection area 160 of the materials handling facility 100. A user may pick an item from an inventory location 220 within the selection area 160 of the materials handling facility 100. One or more imaging devices 208 may obtain/capture one or more images of the item and the user as the item is picked and provide the image(s) to the inventory management system 150 for processing. For example, if the user picks an item, image capture devices 208 that have a visual line-of-sight of the picked item capture images of the item as it is retrieved from the inventory location 220 by the user 204. The captured images are provided to the computing resources 203 (FIG. 4) and processed by the inventory management system 150 to identify the item. The identified item may be associated with the user 204 and/or the tote 207 that is associated with the user.

In other implementations, locations of items within the storage area and/or within each inventory holder may be maintained and/or each item may include an identifier (e.g., visual identifier, RFID). When the item is picked, the location of the item may be determined and the item associated with that location identified as the picked item and associated with the user 204 and/or the tote 207. In addition, or as an alternative thereto, the identifier on the item may be detected (e.g., using a RFID scanner or visual identifier reader) and used to identify the item.

Images of the user may also be captured by the image capture devices 208 and processed to determine when the user is leaving the selection area 106 and/or to determine if the user has provided the picked item and/or tote 207 to a drop off location 228. In other implementations, rather than, or in addition to processing images to determine when the user is leaving the selection area 160, load cells, weight sensors, pressure sensors, or other types of input devices may be included on the floor of the selection area 160 and used to determine the position of the user and whether the user is leaving the selection area 160. In still other examples, if the user is picking items identified on a pick list, once the last item on the pick list that is located in the selection area 160 has been picked, it may be determined that the user is leaving the selection area 160.

Upon determining that the user is leaving the selection area and, if it is determined that the user has not provided the picked item(s) and/or tote 207 to a drop off location, a notification may be presented to the user recommending that they provide the picked item(s) and/or tote to the drop off location. For example, the notification may be presented to the user through one of the output devices (e.g., projector 210, display 212) that is near to the location of the user. Alternatively, the notification may be provided to a portable device 205 associated with the user and presented to the user by the portable device. The notification may include a reminder to provide the picked item(s) and/or tote 207 to a drop off location 228. In addition, the notification may provide guidance to assist the user in locating a drop off location.

In still another example, if the drop off location is mobile (e.g., an agent or mobile drive unit), the notification may be provided by the drop off location. For example, an agent may approach the user and ask to take their tote of picked items so that further processing of the items can be completed for the user.

Once the picked items and/or tote have been provided to the drop off location, the items are transitioned to the processing area 130 for additional processing. After processing, they may be transitioned to a buffer area 140 for temporary storage until the user is ready to retrieve the items. Alternatively, the item may be transitioned directly to the retrieval area 170 for retrieval by the user. When the user retrieves the items from the retrieval area and transitions from the materials handling facility, the user may be charged or assigned a fee for removal of the items from the materials handling facility. For example, if the materials handling facility is a store, the items may be purchased by the user and a fee charged for the purchase of the items.

In some implementations, if information is presented to the user from the inventory management system 150, such information may be presented via the portable device 205 and/or other output devices positioned within the materials handling facility. The portable device may be used to identify to the user a confirmation of the item removed from the inventory location and/or to request that the user identify the inventory item removed from the inventory location. For example, if the identity of a removed inventory item is not able to be confirmed through image processing and/or other means, the inventory management system 150 may identify the item to the user via a user interface 224 and request confirmation that the identified item corresponds to the actual item. For example, the portable device 205 may identify to the user that the user has removed item A from the inventory location. The user may then confirm the identity of the item, identify how many of those items they desire to remove from the materials handling facility and/or identify a different item as the item that was removed from the inventory location. In other implementations, once the picked item is provided to a drop off location and transitioned to the processing area 130, the processing may include identifying the item. For example, an agent may manually identify the item or confirm the identity of items picked by the user.

Figure 3:
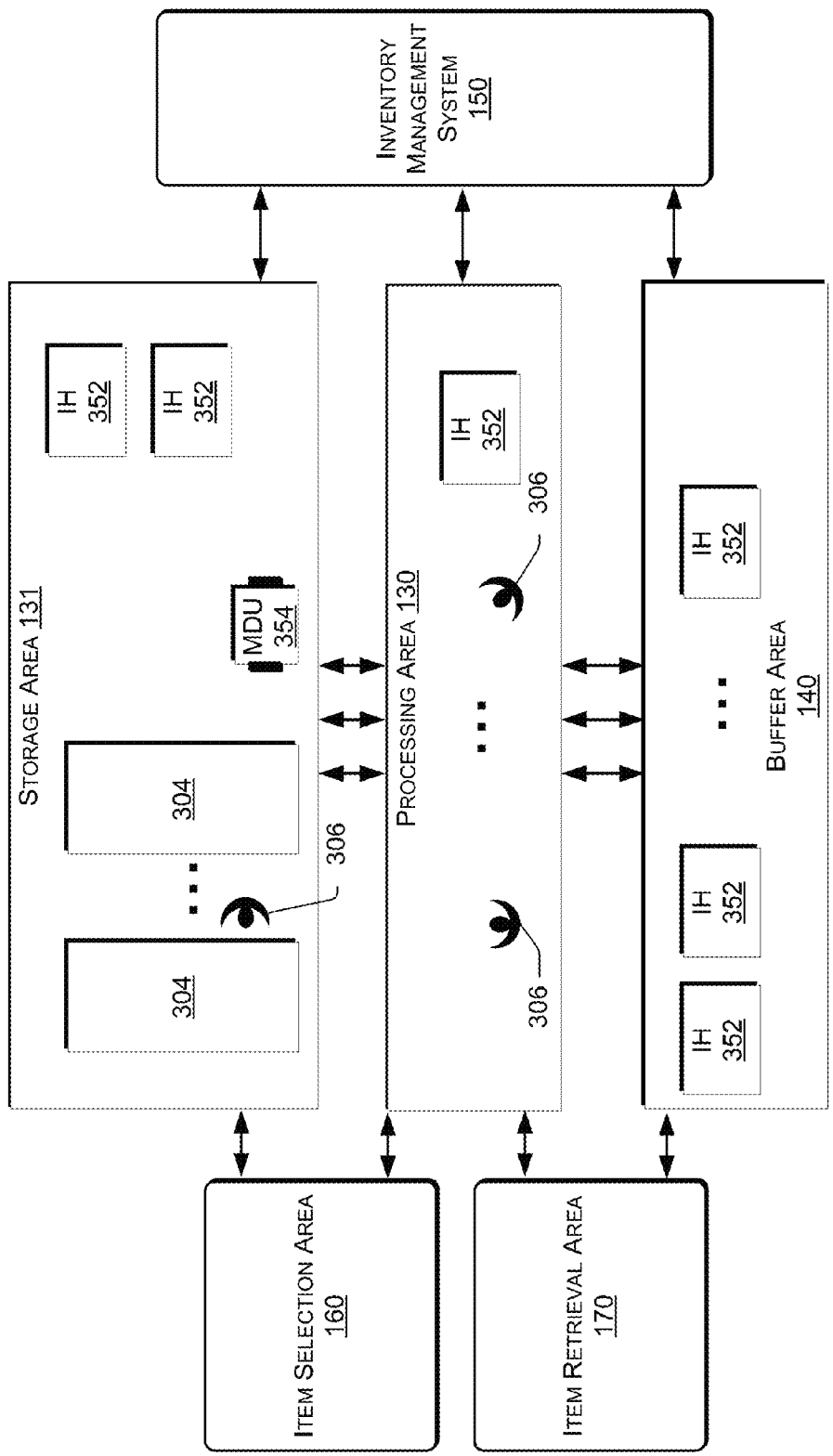
FIG. 3 is a block diagram illustrating additional details of a materials handling facility, according to some implementations.

FIG. 3 is a block diagram illustrating additional details of a materials handling facility, according to some implementations. As illustrated, in some implementations, the storage area 131, processing area 130, buffer area 140, item selection area 160 and item retrieval area 170 may be separate. In other implementations, one or more of those areas may be consolidated. Likewise, as illustrated in FIG. 3, the storage area 131 may include sections for agents 306 to pick ordered or otherwise selected items as well as an area for picking of items using mobile drive units 354. While these sections of the area are shown as separated, in other implementations, the areas may be consolidated. Likewise, agents 306 and/or mobile drive units 354 may pick from either or both of the storage area 131 or the item selection areas 160.

As illustrated, when a user, rather than picking the item from a selection area, orders or otherwise selects an item, that item may be picked from the storage area 131 and either delivered to the user or delivered to the processing area 130. In the processing area 130, one or more agents 306 may perform additional processing with respect to the items. Additional processing may include consolidating items picked by the user from the selection area 160 with items picked by agents in the storage area 131, consolidating items into fewer totes, packing items, gift wrapping, etc. Once all picked items that are associated with a user have been processed at the processing area, the agent may place the items into a buffer area 140 until they are delivered to the user. For example, the agent 306 may place the items onto an inventory holder 352 that is located in the buffer area. As another example, the agent 306 may place the items onto an inventory holder 352 that is transported by a mobile drive unit 354 from the processing area 130 to the buffer area 140. When the items stored in the buffer area 140 are to be delivered to the user, the inventory holder 352 is retrieved from the buffer area 140 by a mobile drive unit 354 and delivered to the user at the item retrieval area 170. Alternatively, the items may be retrieved by an agent and delivered to the user at the item retrieval area 170.

Processing picked items while the user performs other picking within the materials handling facility reduces the need for the user to carry or maintain all of the picked items as they progress through the materials handling facility. In addition, rather than having to wait for all of the items to be processed at the same time when they are done picking, picked items can be processed in smaller batches and made available when the user is ready to exit the materials handling facility. In addition to the improved efficiencies mentioned above, many other benefits are realized. For example, if each selection area may contain like items (e.g., produce, fruit, dairy) and the user provides picked items to a drop off location for additional processing when exiting each selection area, there is a reduced likelihood of incompatible items being placed together. For example, if one selection area contains fresh produce and another cleaning agents, by providing picked items to a drop off area as the user transitions between the two selection areas, the user will not place both item types into the same tote.

Figure 4:
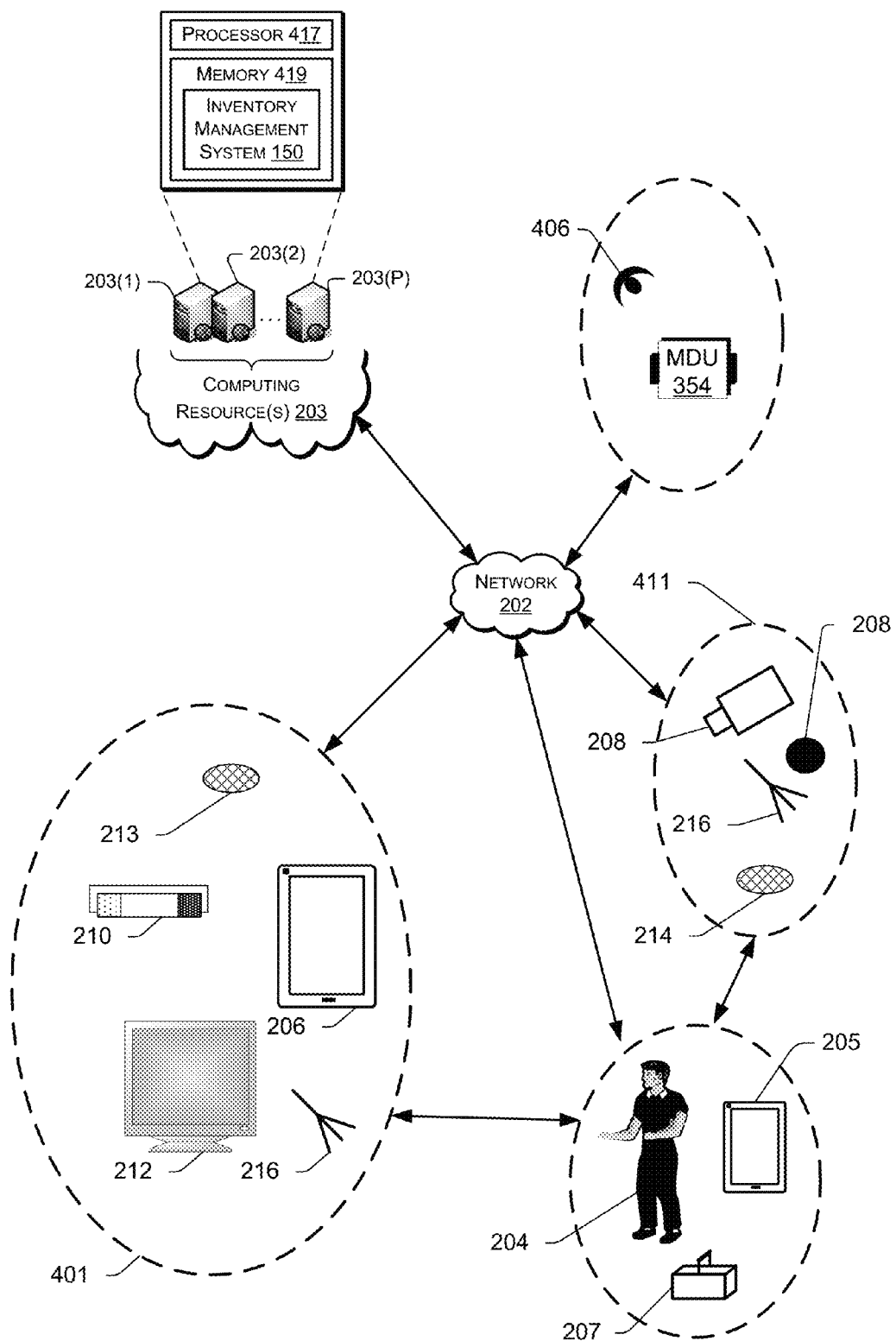
FIG. 4 is a block diagram illustrating components of a materials handling facility, according to some implementations.

FIG. 4 shows additional components and communication paths between component types utilized in a materials handling facility 100 with an inventory management system 150 of FIG. 1, in accordance with some implementations. As discussed above, the portable device 205 may communicate and interact with various components over a variety of communication paths. Generally, the inventory management system 150 and/or the materials handling facility 100 may include input components 411, output components 401 and computing resource(s) 203. The input components 411 may include a camera 208, microphone 214, antenna 216, sensor (not shown), scale (not shown), light curtain (not shown), active tag reader (not shown), visual identifier reader (not shown), or any other component that is capable of receiving input about the surrounding environment, from the user of the portable device, the tote 207 and/or from the portable device 205. The output components 401 may include a projector 210, a portable device 206, a display 212, an antenna 216, a radio (not shown), speakers 213 and/or any other component that is capable of providing output. In some implementations, the display 212 may be fixedly mounted to a location within the materials handling facility. In other implementations, the display 212 may be attached to the tote 207.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 202 with input components 411, output components 401, agents 406, mobile drive units 354, and/or directly with the portable device 205, the tote 207 and/or the user 204.

As illustrated, the computing resource(s) 203 may be remote from the environment and implemented as one or more servers 203(1), 203(2), . . . , 203(P) and may, in some instances, form a portion of a network-accessible computing platform implemented as a computing infrastructure of processors, storage, software, data access, and so forth that is maintained and accessible by components/devices of the inventory management system 150 via a network 202, such as the Internet. For example, the computing resources 203 may process images to determine whether an item has been removed from an inventory location or placed into an inventory location. Likewise, the computing resources 203 may determine pick paths for agents 406 and/or mobile drive units 354 for picking and delivering selected items. The computing resource(s) 203 do not require end-user knowledge of the physical location and configuration of the system that delivers the services. Common expressions associated with these remote computing resource(s) 203 include "on-demand computing," "software as a service (SaaS)," "platform computing," "network-accessible platform," "cloud services," "data centers," and so forth.

Each of the servers 203(1)-(P) include a processor 417 and memory 419, which may store or otherwise have access to an inventory management system 150, which may include or provide image processing (e.g., for user identification, expression identification, and/or item identification), inventory tracking, picked item processing, processing sequencing, or location determination, etc.

The network 202 may utilize wired technologies (e.g., wires, USB, fiber optic cable, etc.), wireless technologies (e.g., RF, IR, NFC, cellular, satellite, Bluetooth, etc.), or other connection technologies. The network 202 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some implementations, the inventory management system 150 may be utilized to process images received from multiple material handling facilities. For example, the remote computing resources 203 may communicate over the network 202 with multiple material handling facilities to control picking and/or storage of items and to provide instructions to mobile drive units 354 and/or agents 406.

Figure 5:
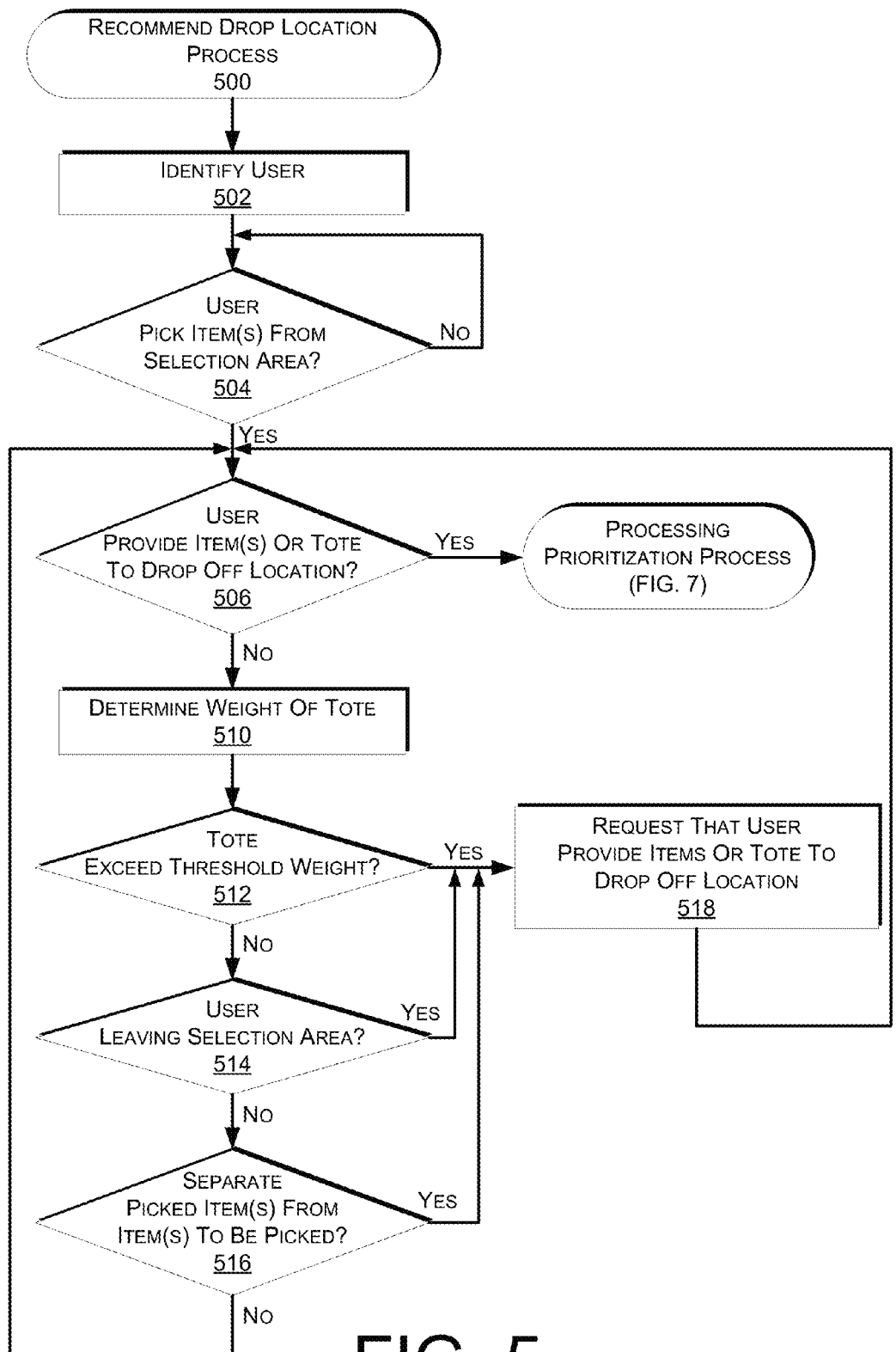
FIG. 5 is a flow diagram of an example recommended drop off location process, according to some implementations.

FIG. 5 depicts a flow diagram of an example recommended drop off location process 500, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by identifying a user, as in 502. User identification may be done using a variety of techniques. For example, the user may be identified using facial recognition, based on an identifier provided by the user, based on an identifier carried by the user, and/or any combination thereof. In some implementations, the user may be identified as they near the materials handling facility. For example, the user may provide the inventory management system with an identification of the automobile (e.g., license plate), or the user may be assigned an identifier that is detected as they approach the materials handling facility. In other implementations, the user may notify the inventory management system of their pending arrival to the materials handling facility.

Upon user identification, a determination is made as to whether the user has picked one or more items from an inventory location in a selection area of the materials handling facility, as in 504. As discussed above, various techniques may be used to determine if a user has picked an item. For example, image capture devices may capture images of the item as it is picked, load cells, pressure sensors or scales positioned within the inventory location may detect a reduction in weight resulting from the picked item being removed from the inventory location. In other examples, an active tag on the item may be detected as the item is removed from the shelf. In still other examples, the picking of an item may be detected by a tote that is in the possession of the user. For example, the tote may include pressure sensors, load cells, scales, etc., and may detect an increase in weight resulting from a picked item placed into the tote.

If it is determined that an item has not been picked, the process 500 remains at decision block 504 until an item is picked. When it is determined that an item has been picked, a determination is made as to whether the user has provided the picked item(s) or a tote containing the picked item(s) to a drop off location, as in 506. If it is determined that the user has provided the picked item(s) or a tote containing the picked item(s) to a drop off location, the item(s), or tote containing the items, are transitioned to the processing area of the materials handling facility and processing of those items is determined according to the processing sequencing process 700, discussed below with respect to FIG. 7.

Returning to decision block 506, if it is determined that the user has not provided the picked item(s) or a tote containing the picked item(s) to a drop off location, several factors may be considered to determine whether a notification should be provided to the user that requests that that user provide the picked item(s) to a drop off location. The factors discussed with respect to this example process 500 are provided only as examples and more or fewer factors may be considered in determining whether to provide a notification to the user. Likewise, as with all of the processes discussed herein, while the below examples are discussed in a serial manner, one or more factors may be considered in parallel.

Returning to the example process 500, the weight of the tote is determined, as in 510. The weight of the tote may be determined, for example, based on knowledge of the weight of items that have been picked by the user and placed into the tote. Alternatively, the tote may include scales, load cells, pressure sensors, etc., in the bottom of the tote that can measure the weight of items placed in the tote. The measured weight may then be provided to the inventory management system and used as the weight of the tote. In still another example, the floor of the materials handling facility may include scales, load cells, pressure sensors, etc., and an increase in the total weight of the tote (or the total weight of the tote and the user) may be determined and used as the weight of the tote.

Based on the weight of the tote, a determination is made as to whether the weight of the tote exceeds a threshold weight. The threshold weight may be any defined value and may vary for different users and/or for different totes. For example, totes that are transported on wheels may have a higher threshold weight than totes that are carried by users. If it is determined that the weight of the tote exceeds the threshold weight, a notification is generated and presented to the user requesting that the user provide the picked item(s) or the tote containing the picked item(s) to a drop off location, as in 518. In some implementations, the notification may be presented using one or more of the output devices included in the materials handling facility. In other implementations, the notification may be provided to a portable device in the possession of the user. In still other implementations, the drop off location may be mobile and move to the location of the user and provide the notification to the user.

If it is determined that the weight of the tote does not exceed the threshold weight, a determination is made as to whether the user is leaving the selection area, as in 514. As discussed above, movement of the user may be monitored (e.g., via captured images, load cells in the floor of the materials handling facility) and the location and direction of the user may be used to determine if the user is leaving the selection area. As another example, a virtual boundary may exist around the selection area and, as the user approaches or crosses the virtual boundary, it may be determined that the user is leaving the selection area. In another example, it may be determined that the user is leaving the selection area after they have actually left the selection area. For example, each selection area within a materials handling facility may be a defined area and there may be a separation area between each selection area. When the user exits a selection area and enters the separation area, it may be determined that the user is leaving the selection area. In still another implementation, if the user is picking items identified on a pick list, once the user has picked the last item from the pick list that is located in the selection area, it may be determined that the user is leaving the selection area. As another example, external factors may be considered to determine if the user is leaving the selection area. For example, if there is an announcement regarding a sale of an item, a lost article of the user, etc. (external factor) that causes the user to move toward a boundary of the selection area, it may be determined that the user is leaving the selection area. In still other example, rather than using image processing, a positioning system (e.g., indoor positioning) may be used to monitor the location and of the user and determine if the user is leaving the selection area.

If it is determined that the user is leaving the selection area, a notification is generated and presented to the user requesting that the user provide the picked item(s) or the tote containing the picked item(s) to a drop off location, as in 518. In some implementations, the notification may be presented using one or more of the output devices included in the materials handling facility. In other implementations, the notification may be provided to a portable device in the possession of the user. In still other implementations, the drop off location may be mobile and move to the location of the user and provide the notification to the user.

If it is determined that the user is not leaving the selection area, a determination is made as to whether the picked items should be separated from other items to be picked by the user while in the selection area, as in 516. For example, even though the weight of the tote may not exceed the threshold weight, the total weight of all items that are expected to be picked by the user while in the materials handling facility may be considered and a determination made as to how the items should be distributed among totes. For example, assume that the threshold weight is ten pounds, that the user has already picked three items having a total weight of five pounds and the user has another three items to pick that each weigh three pounds. Rather than waiting to send the notification after the user has picked another two items and exceeded the threshold weight, which would result in the second tote only including one item of three pounds, the notification may be sent after the next item is picked. In such an example, the first tote would include four items and have a total weight of eight pounds and the second tote would include two items and have a total weight of six pounds.

As another example, the type and/or fragility of the items already picked or to be picked may be considered as a factor in determining whether to separate the already picked items from items to be picked by the user while in the selection area. For example, if the items already picked may be easily broken or crushed by other items that will be picked by the user while in the selection area, it may be determined that the items are to be separated. For example, if the user has picked a loaf of bread from the selection area and the next item for the user to pick is a watermelon, it may be determined that the items should be separated.

In still other implementations, a user may specify what types of items are to be separated and that user provided information may be used to determine if picked items are to be separated from items to be picked. For example, a user may specify that all liquid items are to be separated from non-liquid items.

If it is determined at decision block 516 that the picked items should be separated from other items to be picked by the user while in the selection area, a notification is generated and presented to the user requesting that the user provide the picked item(s) or the tote containing the picked item(s) to a drop off location, as in 518. In some implementations, the notification may be presented using one or more of the output devices included in the materials handling facility. In other implementations, the notification may be provided to a portable device in the possession of the user. In still other implementations, the drop off location may be mobile and move to the location of the user and provide the notification to the user.

The notifications provided at block 518 may also include guidance or directions that assist the user in navigating to the drop off location. For example, the notification may include a graphical representation illustrating the direction in which the user should move to find the nearest drop off location.

If it is determined at decision block 516 that the already picked items are not to be separated from items to be picked by the user while in the selection area, the example process returns to block 506 and continues.

Figure 6A:
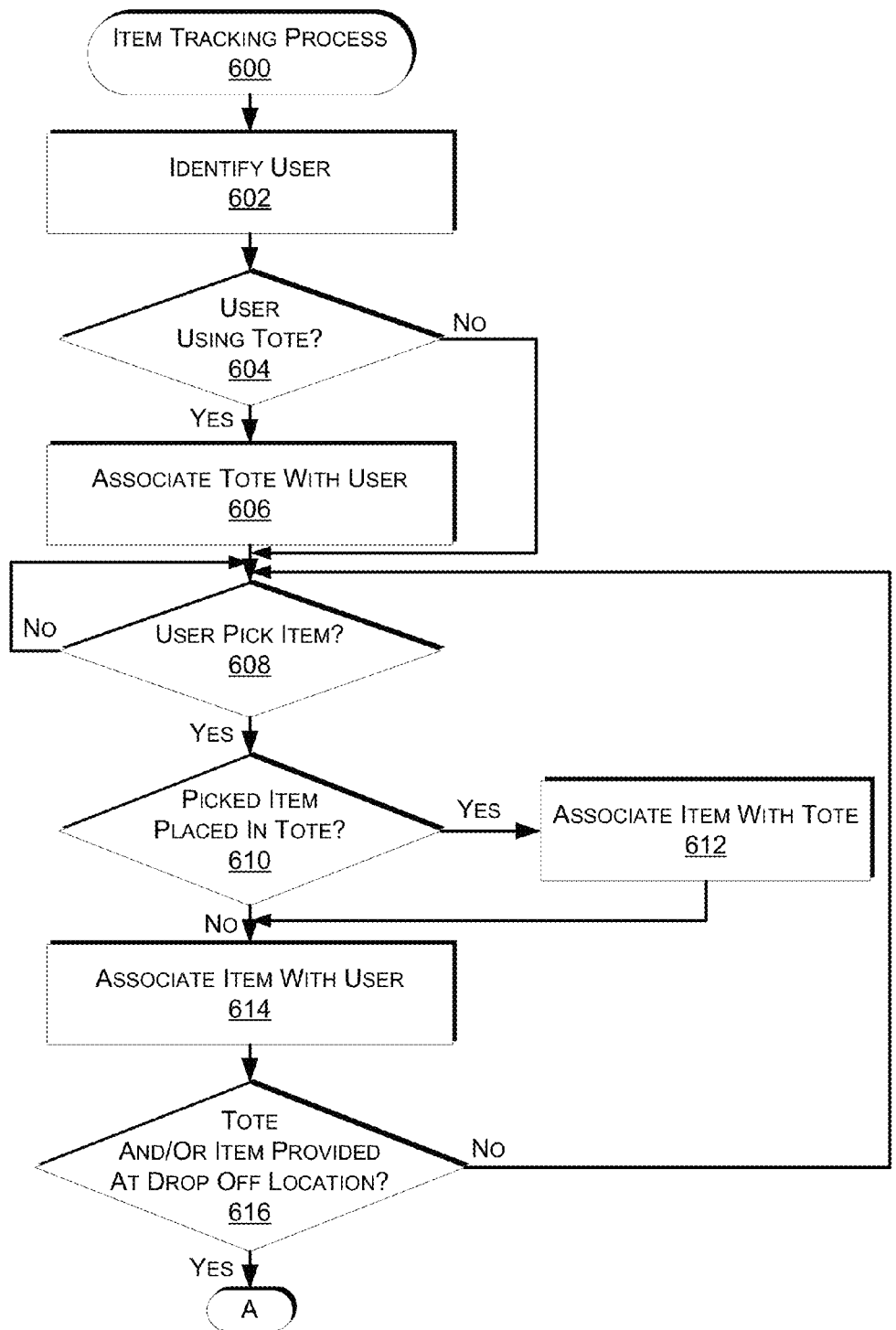
FIGS. 6A-6B is a flow diagram of an example item tracking process, according to some implementations.
Figure 6B:
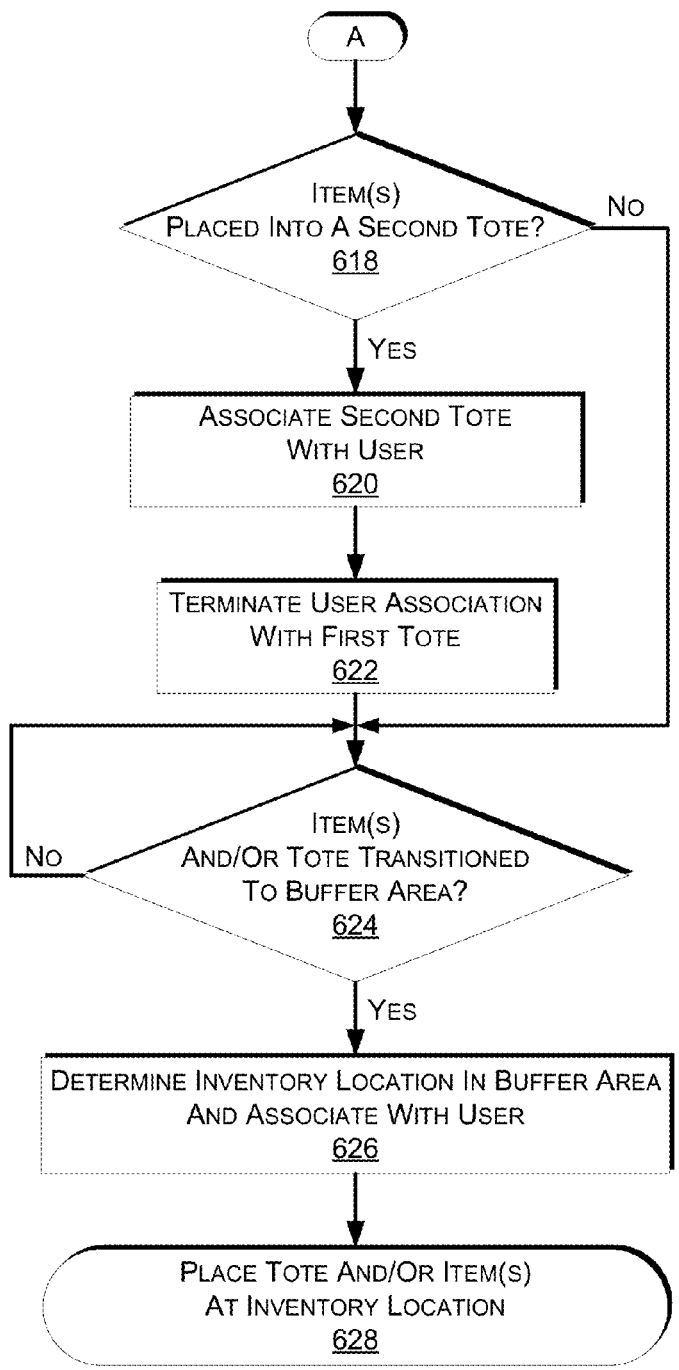

FIGS. 6A-6B is a flow diagram of an example item tracking process 600, according to some implementations. The example process 600 begins by identifying a user, as in 602. User identification may be done using a variety of techniques. For example, the user may be identified using facial recognition, based on an identifier provided by the user, based on an identifier carried by the user, and/or any combination thereof. In some implementations, the user may be identified as they near the materials handling facility. For example, the user may provide the inventory management system with an identification of the automobile (e.g., license plate), or the user may be assigned an identifier that is detected as they approach the materials handling facility. In other implementations, the user may notify the inventory management system of their pending arrival to the materials handling facility.

Upon user identification, a determination is made as to whether the user is using a tote, as in 604. Determining whether a user is using a tote may be done based on, for example, image analysis to determine if the user is carrying, pushing or otherwise using a tote. In some implementations, totes may be available for retrieval by users at various locations within the materials handling facility. For example, totes may be available for selection at the entrance to the materials handling facility, at each selection area and/or next to each drop off location.

If it is determined that the user is using a tote, the tote is identified and associated with the user, as in 606. Totes may be identified based on visual or active tags included on or in the totes. In some implementation, each tote may include a unique visual tag, such as a unique number, barcode, QR code, bokode, color, shape etc. In other implementations, each tote may include an active tag (e.g., RFID) that is used to identify the tote. Based on the identification, the tote is associated with the user.

After associating the tote with the user, or if it is determined that the user is not using a tote, a determination is made as to whether the user has picked an item, as in 608. As discussed above, various techniques may be used to determine if a user has picked an item. For example, image capture devices may capture images of the item as it is picked, load cells, pressure sensors or scales positioned within the inventory location may detect a reduction in weight resulting from the picked item being removed from the inventory location, etc. In other examples, an active tag on the item may be detected as the item is removed from the shelf. In still other examples, the picking of an item may be detected by the tote associated with the user. For example, the tote may include pressure sensors, load cells, scales, etc., and may detect an increase in weight resulting from a picked item being placed in the tote.

If it is determined that the user has not picked an item, the example process remains at decision block 608. When it is determined that the user has picked an item, a determination is made as to whether the item has been placed into a tote, as in 610. The tote may be the tote associated with the user or another tote (e.g., a tote in the possession of an agent assisting the user). Similar to determining if the user has picked an item, visual and/or other inputs may be used to determine if the user has placed an item in the tote. In some implementations, even though the user is using a tote, a picked item may not be placed into the tote. For example, a user may pick an item and provide it directly to an agent for processing.

If it is determined that the user has placed the item into the tote, the item is associated with the tote, as in 612. If it is determined that the item has not been placed in a tote, the item is associated with the user, as in 614. In some implementations, regardless of whether the item is placed in a tote, the item may be associated with the user. Association of the item with the tote and/or the user may be done based on an identifier associated with the item, based on an image captured of the item and/or based on other information about the item. For example, if the item includes a unique identifier, the unique identifier may be determined and associated with the tote and/or the user. Alternatively, if the item does not include a unique identifier (e.g., the item is produce), an image of the item may be associated with the tote and/or the user. As another example, the identity of the item may be determined and associated with the tote and/or the user.

At decision block 616 a determination is made as to whether the tote and/or the picked item has been provided to a drop off location, as in 616. As discussed above, a drop off location may be a fixed location within the materials handling facility or the drop off location may be mobile. For example, a mobile drop off location may be an agent that retrieves the tote or picked items from the user. Alternatively, a mobile drop off location may be a mobile drive unit that retrieves the tote or picked items from the user.

If it is determined that the picked items or tote have not been provided to a drop off location, the example process returns to decision block 608 and continues. However, if it is determined that the tote or the picked items have been provided to a drop off location, a determination is made as to whether the item(s) have been placed into a second tote, as in 618. As discussed above, when items are provided to a drop off location, the items are transitioned to the processing area for processing. Processing may include consolidating multiple totes of items picked by the user, packing items, etc. In each instance, one or more items picked by the user may be moved from one tote to another tote.

If it is determined that the item(s) have been placed into a second tote, the second tote is identified and associated with the user, as in 620. Likewise, the item(s) may be associated with the second tote. Assuming all of the picked items have been removed from the first tote, the association between the user and the first tote is terminated, as in 622. Terminating the association between an empty tote and the user, when the user is no longer using the tote, allows the tote to be returned to the materials handling facility for selection and use by the user or another user.

At decision block 624 a determination is made as to whether the picked items or the tote(s) containing the picked item(s) have been transitioned to the buffer area, as in 624. As discussed above, after processing of picked items associated with a user, the items may be transitioned to a buffer area for temporary storage until they are retrieved by the user associated with the item. If the items have not been transitioned to the buffer area (i.e., they are still being processed), the example process 600 remains at decision block 624. However, once it is determined that the picked item(s) have transitioned to the buffer area, an inventory location within the buffer area is determined and associated with the user, as in 626. The inventory location in the buffer area may be any location at which the picked item(s) associated with the user may be temporarily stored. In some implementations, the inventory location may be an inventory holder that is configured for transport by a mobile drive unit. In another example, the inventory location may be a shelf onto which the inventory items are placed. Once the inventory location is determined and associated with the user, the picked inventory item(s) or the tote(s) containing the inventory items are placed at the selected inventory location, as in 628.

Figure 7:
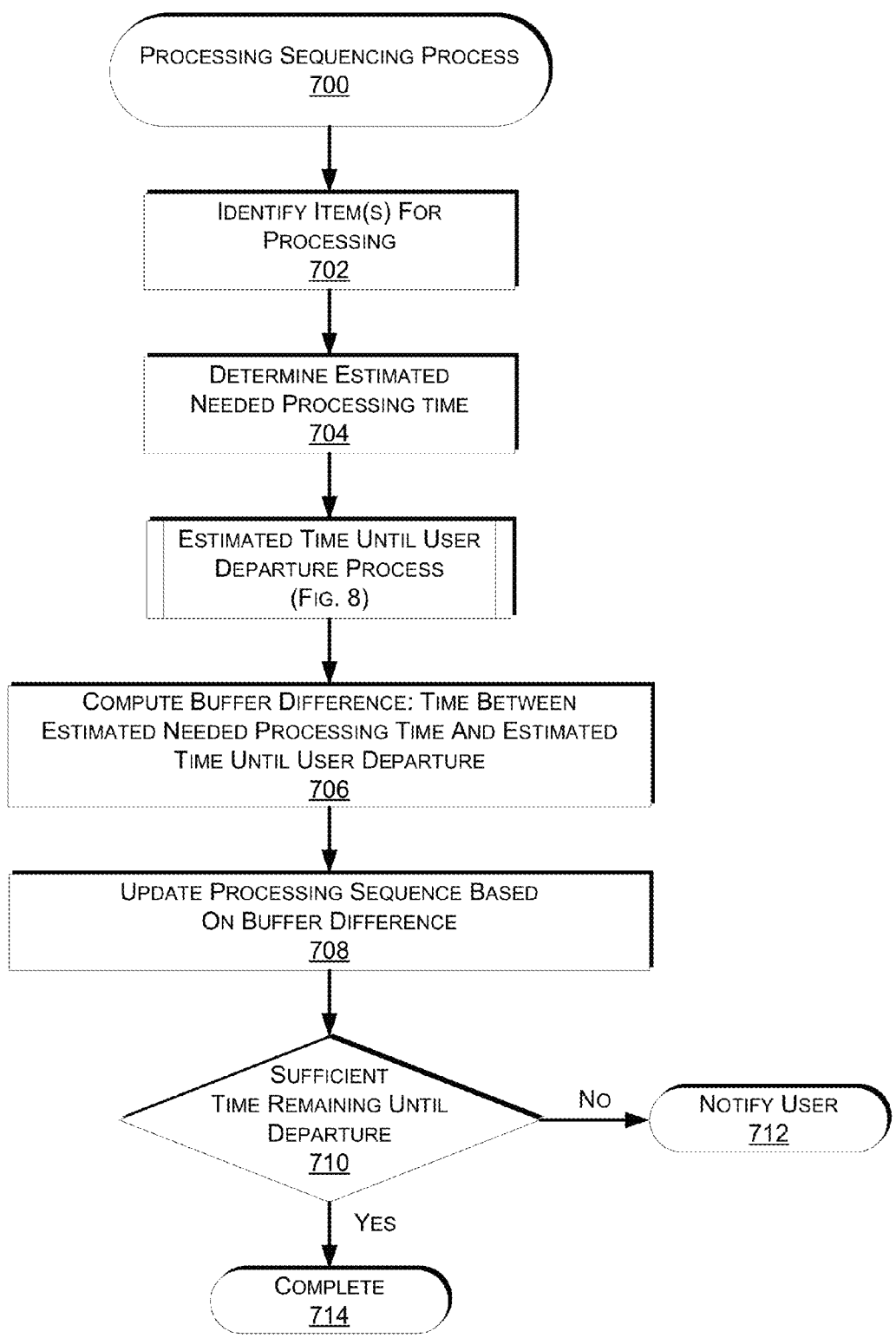
FIG. 7 is a flow diagram of a processing sequencing process, according to some implementations.

FIG. 7 is a flow diagram of a processing sequence process 700, according to some implementations. In this example, processing will include consolidation and packing of items picked by a user for later retrieval by a user. In other examples, the processing could include other activities, such as consolidation of items from multiple totes, gift wrapping, assembly, preparation (e.g., cutting, bagging, slicing), weighing, identification, etc.

The example process 700 begins by identifying items picked by a user that are to be processed, as in 702. This may be one item or a plurality of items. Item(s) picked by a user is referred to herein as a set. In some implementations, the identity of the items may be determined when the user picks the items and a list of picked items associated with the user generated and maintained by the inventory management system. In other implementations, the identity of one or more of the items may not be known. In such a case, one or more images of the item may be obtained and processed using object, shape and/or character recognition to attempt to identify the item. In other examples, an agent in the processing area may manually identify the item.

Based on the identity of the items, an estimated needed processing time is determined, as in 704. In some implementations, the inventory management system maintains an estimated processing time, or an average time that is consumed by agents in processing (e.g., packing) each item. This estimated processing time may be different for each item, different for different agents, and/or different for different users. For example, it may take longer to process item A than it does to process item B. Likewise, some agents may be able to process items faster than other agents and therefore each item may have a different estimated processing time depending on the agent that is assigned to process the items. In still other implementations, estimated processing times may be different for different users. For example, some users may request additional packing of the items to reduce the likelihood of damage. Based on the identity of each item and the respective processing times, an estimated needed processing time may be determined. For example, if it is determined that there are four items, the first takes fifteen seconds to process, the second takes ten seconds to process, the third takes twelve seconds to process and the fourth takes fifteen seconds to process, it may be determined that the estimated needed processing time for the four items is fifty-two seconds.

In some implementations, rather than maintaining potentially different estimated processing times for each item, an average processing time may be maintained for all items, agents, and/or users. In such an implementation, the identity of the items is not needed and the estimated processing time can be computed based on the number of items included in the items to be processed for the user. For example, if the estimated processing time for all items is five seconds per item and there are ten items, the estimated needed processing time is fifty seconds.

While the above examples determine a processing time as a sum of processing times for each item, in other implementations, the processing time may factor in other efficiencies. For example, while each individual item may have an estimated processing time (or all items may be assigned the same processing time) if multiple items are being processed, the combined time may be reduced to reflect the efficiencies gained from processing multiple items together. In such an example, the first item to be processed may be allocated the full time associated with that item but the processing time of other items may be weighted or reduced to account for the efficiencies gained from processing multiple items together.

Likewise, while the above examples consider the items already picked by the user and provided to a drop off location for processing, in some implementations, the example process 700 may also consider items that are anticipated to be picked, ordered or otherwise selected by the user and/or items that are picked by an agent on behalf of the user. For example, if the user has picked five items and provided those items to a drop off location for processing, the example process 700 may determine that the user still has ten more items to pick and that an agent is scheduled to pick another three items for the user. The estimated needed processing time for those additional items, as well as the estimated time until those items are received into the processing area, may also be considered.

In addition to determining the estimated needed processing time, the estimated time until user departure for the user associated with the items is also determined. The process for determining the estimated time until user departure is discussed further below with respect to FIG. 8.

Based on the determined estimated needed processing time for the items and the determined estimated time until user departure for the user associated with the items, a buffer difference is computed, as in 706. The buffer difference identifies the buffer or additional time that is available before processing of the items needs to be completed so that the items can be available for retrieval by the user. In this example, the buffer difference is computed based on the determined estimated needed processing time and the determined estimated time until user departure for the user associated with the items. In other examples, additional factors may also be included in the computation. For example, the time required to transition the items from the processing area to the buffer area and/or the time required to transition the processed items from either the processing area or the buffer area to the retrieval area may also be included in the computation.

Blocks 702-708 may be performed for each user in the materials handling facility that has provided one or more items for processing. Based on the determined buffer difference for each user, a processing sequence for all sets of items picked by users in the materials handling facility may be updated, as in 708. For example, the items with the smallest buffer distance may be processed first so that the items are available to the user.

It may also be determined whether sufficient time is remaining to complete processing of the items before the user is anticipated to depart the materials handling facility, as in 710. If it is determined that there is not sufficient time remaining to process the items before the user is anticipated to depart the materials handling facility, the user may be notified, as in 712. For example, if the user is anticipated to depart in ten minutes, but fifteen minutes are estimated as the needed processing time, a notification may be provided to the user (e.g., using their portable device or an output device in the materials handling facility) informing them of the time remaining until the items they picked are available for retrieval. In some implementations, other recommendations, discounts, incentives or other options may also be provided to the user. For example, a recommendation may be made that the user rest for a few minutes, or view a section of books in the materials handling facility. Alternatively, a discount may be offered to the user for the potential inconvenience of having to wait for the items picked by the user to complete processing. As still another example, rather than asking the user to wait until processing is completed, the user may be given the option to have some or all of the processed items delivered to a user selected destination (e.g., their home) when processing is complete.

In comparison, if it is determined that sufficient buffer time remains, the user may not be notified, as in 714. In other examples, the user may always be notified of the estimated processing time for items they have picked and provided to a drop off location for processing.

While the above example contemplates processing items for a user and then placing those items in a buffer area as a single activity, in some implementations, processing of items for a user may be performed in stages. For example, a first group of items may be received into the processing area and the example process 700 may add the items to a processing sequence. The items may also be processed and stored in the buffer area. At a later time, additional items picked by the user may be processed in a similar manner. This may be done separate from the initial processing and the processed item(s) added to the inventory location in the buffer area associated with the already processed items, or the already processed items may be returned from the buffer area to the processing area for consolidation.

Figure 8:
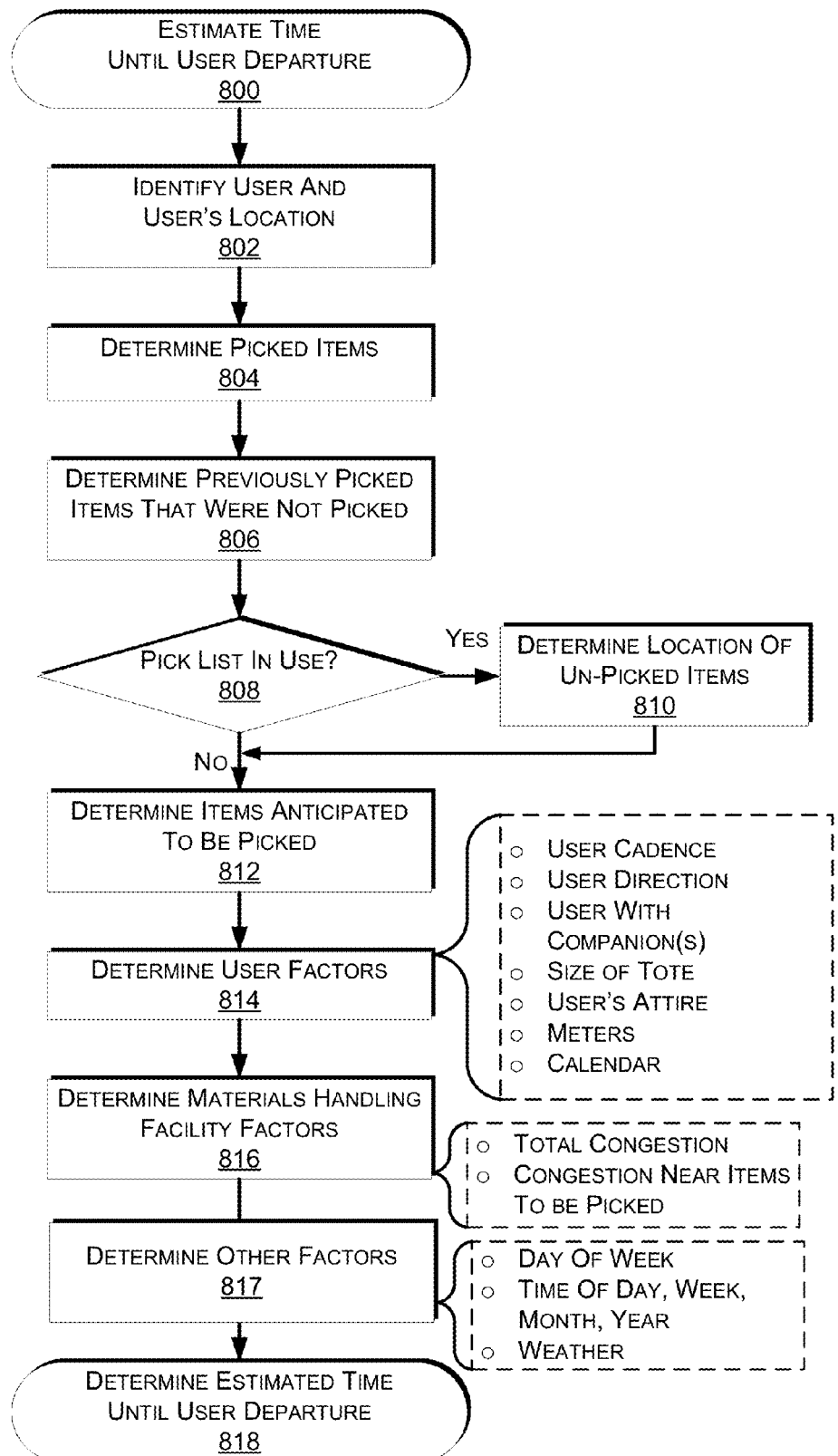
FIG. 8 is a flow diagram of an estimated time until user departure process, according to some implementations.

FIG. 8 is a flow diagram of an estimate time until user departure process 800, according to some implementations. The example process 800 begins by identifying the user and the user's location, as in 802. User identification techniques are discussed above. A user's location may be determined in a similar manner. For example, when a user is identified using image processing, the user's location may also be determined based on the processed images. For example, the user's surrounding (e.g., aisles, markers, items) may be processed to determine the location of the user. Likewise, the input device that captured the images may be associated with a location within the materials handling facility and that location may be determined as the user's location. In still other implementations, the portable device and/or tote in the possession of the user may transmit an identifier that can be used to determine the location of the user. For example, a pattern of light that is unique to the tote or portable device may be transmitted. The light pattern may be captured in a series of images, detected and used to determine the location of the user. In still other examples, input devices (scales, load sensors, pressure sensors, etc.) may be included in the floor of the materials handling facility and used to determine the location of the user. As will be appreciated, other techniques may be utilized alone or in combination with those discussed herein to determine the location of the user.

In determining the estimated time until departure for a user, a variety of factors may be considered. While the example process 800 discusses some of those factors, it will be appreciated that these are intended to be illustrative in nature and not exhaustive. Likewise, while the example process 800 is discussed in a serial manner, in some implementations, one or more of the factors may be considered in parallel.

In addition to determining the location of the user, the items picked by the user may be determined, as in 804. As discussed above, items may be identified and associated with the user as they are picked by the user. In such an example, the items picked by the user may be identified in a picked items list that is associated with the user. The user's profile may also be considered and a determination made as to whether the user has skipped any items that have been previously picked by the user, or that are frequently picked by the user, as in 806. For example, the user profile may maintain a pick history identifying items that have previously been picked by the user, the frequency with which items are picked by the user and/or the last time each item was picked by the user. Based on this information, and based on selection areas or areas of the materials handling facility already visited by the user, a determination may be made as to what items that have previously been picked by the user have been skipped. This information may be useful in determining if the user is planning to only pick a few items from the materials handling facility or pick several items. For example, if the user has only picked two items but has skipped several items that are frequently picked by the user, this may be an indication that the user will only be in the materials handling facility for a limited period of time, picking only a small set of items.

A determination may also be made as to whether a pick list is being used by the user to pick items, as in 808. A pick list may be generated by the user or assigned to the user, identifying items that are to be picked by the user. For example, if the user is a picking agent, a pick list may be generated by the inventory management system, and assigned to the user identifying the items to be picked by the user while in the materials handling facility. If it is determined that a pick list is being used, the location of the unpicked items identified on the pick list is determined, as in 810. Alternatively, if it is determined that a pick list is not being used, the items anticipated to be picked by the user are determined, as in 812.

Anticipated items may be determined based on the user's past pick history, promotions presented to the user, advertisements presented to the user, items skipped by the user, based on items that are complimentary to other items picked and anticipated to be picked, etc. For example, if the user typically picks the same four items (A, B, C, D) during each visit to the materials handling facility, it may be anticipated that the same four items will be picked during the current visit to the materials handling facility. Likewise, if the user typically picks certain items together (e.g., if the user picks item B, they also pick item F) and/or if certain items are typically picked together by most users, it may be determined that both items will be picked if one of those items has already been picked. Likewise, in some instances, if one of the items has been skipped, it may be anticipated that the other item will not be picked. The frequency of item picking and/or the time since the last picking of an item may also be considered in determining items that are anticipated to be picked by the user. For example, if the user typically picks milk every two weeks and it has only been two days since they last picked milk, it may be anticipated that the user will not pick milk during this visit to the materials handling facility.

In addition to determining a pick list and/or anticipated items to be picked, other user factors may be considered, as in 814. These factors may be considered in determining the anticipated items to be picked as well as the time required to pick items. For example, the cadence, direction, etc., may be considered to determine the speed at which the user is progressing through the materials handling facility and the path they are taking through the materials handling facility. If the user is moving at a cadence that is typical for the user, based on past user interaction, the estimated time until departure can be computed based on that cadence and how much time the user typically takes to pick items and progress through the materials handling facility. However, if the user is moving at a cadence that is faster than typical for that user, it may be determined that the user is in a hurry. In such an example, fewer items may be picked (and thus the list of anticipated items may be updated) and the time between picks will be reduced as a result of the increased cadence.

Other user factors may also influence the speed at which the user may progress through the materials handling facility. For example, if the user is accompanied by one or more companions (e.g., spouse, child, parent, friend, pet) a cadence for the group may be determined. To illustrate, if the user is with a child, the cadence of the group may be slower as the child may want to stop and look at additional items. Likewise, if it is determined that the user is injured (e.g., using crutches), the user's cadence may be slower.

In some implementations, the user may provide information about their meetings and/or calendar entries that can be utilized to anticipate a time by which the user will leave to reach their next meeting. In still other implementations, it may be determined whether the user arrived and/or will depart by bus or car. If the user arrived and/or will depart by bus, the bus schedule may be considered to determine when the user will likely leave to catch the bus. Likewise, if the user arrived via car that is parked in a metered or time limited area, the time limit for the area may be considered as a factor in determining the estimated time until user departure.

The size of the tote selected by the user may also be considered as a factor in determining the estimated time until departure of the user. For example, if the user has selected a large tote, it may indicate that the user intends to pick several items. Likewise, a large tote may slow the cadence of the user. In comparison, if the user selects a small tote, or does not select a tote at all, it may be an indication that the user does not intend to select as many items.

Still other user factors may be considered in estimating the time until user departure for the user. For example, the user's attire, the user's mood, etc., may all be considered as factors in determining both how many items the user is anticipated to pick and how long it will take the user to progress through the materials handling facility picking those items. For example, if it is late in the night and the user is wearing very casual clothes (e.g., sweatpants), it may be determined that the user is only making a quick visit to the materials handling facility to pick a few items.

In addition to user factors, one or more materials handling facility factors may be considered in determining the estimated time until user departure for the user, as in 816. For example, the total congestion of the materials handling facility and/or the congestion in areas of the materials handling facility that contain items anticipated to be picked by the user may be considered. If the materials handling facility, or portions thereof are congested, it may take the user additional time to progress through the materials handling facility, thereby increasing the estimated time until user departure.

In some implementations, other factors beyond user factors and/or materials handling facility factors may be determined, as in 816. For example, the day of the week, time of day, time of week, time of month, time of year may be determined and used as factors in determining an estimated time until user departure. For example, if it is a holiday and the user is arriving early, it may be determined that they are picking several items for a big event. Other factors include weather, the projected weather, etc. For example, if a heavy storm (e.g., snow storm) is anticipated, it may be used as a factor in determining that the user may be picking several items and thus may has a longer estimated time until departure.

Based on the factors (e.g., user factors, materials handling facility factors, other factors) considered as part of the example process 800, an estimated time until user departure may be determined, as in 818. For example, based on the anticipated items to be picked by the user and the cadence of the user through the materials handling facility, it may be determined how long it will take the user to progress through the materials handling facility and pick each anticipated item. For example, distance information relating to the items may be determined and used to compute an estimated time for the user to move between the locations of each item to pick the items. Distance information may identify a straight line distance between items, a walkable path between items (e.g., a pick path), a distance between selection areas containing the items, and the like. The computed time may be determined as the estimated time until user departure. In some implementations, other factors, such as the congestions within the materials handling facility, congestions near items anticipated to be picked, whether the user is with companions, items picked by the user, items anticipated to be picked by the user, anticipated items not picked, or skipped, by the user, and/or other information may also be used as a factor in determining the estimated time until user departure.

The example process 800 may be performed on a periodic or ongoing basis such that the estimated time until user departure is updated based on changes in the environment. For example, if the user skips one or more items anticipated to be picked by the user, the estimated time until user departure may be adjusted. Likewise, if the user changes cadence, the estimated time until user departure may be increased or decreased to account for the change in cadence. Other factors may also influence the estimated time until user departure. For example, if the user receives a phone call while in the materials handling facility and performs an action of writing down additional items, it may be anticipated that the user will be picking additional items and, thus, the estimated time until user departure may be increased.

Figure 9:
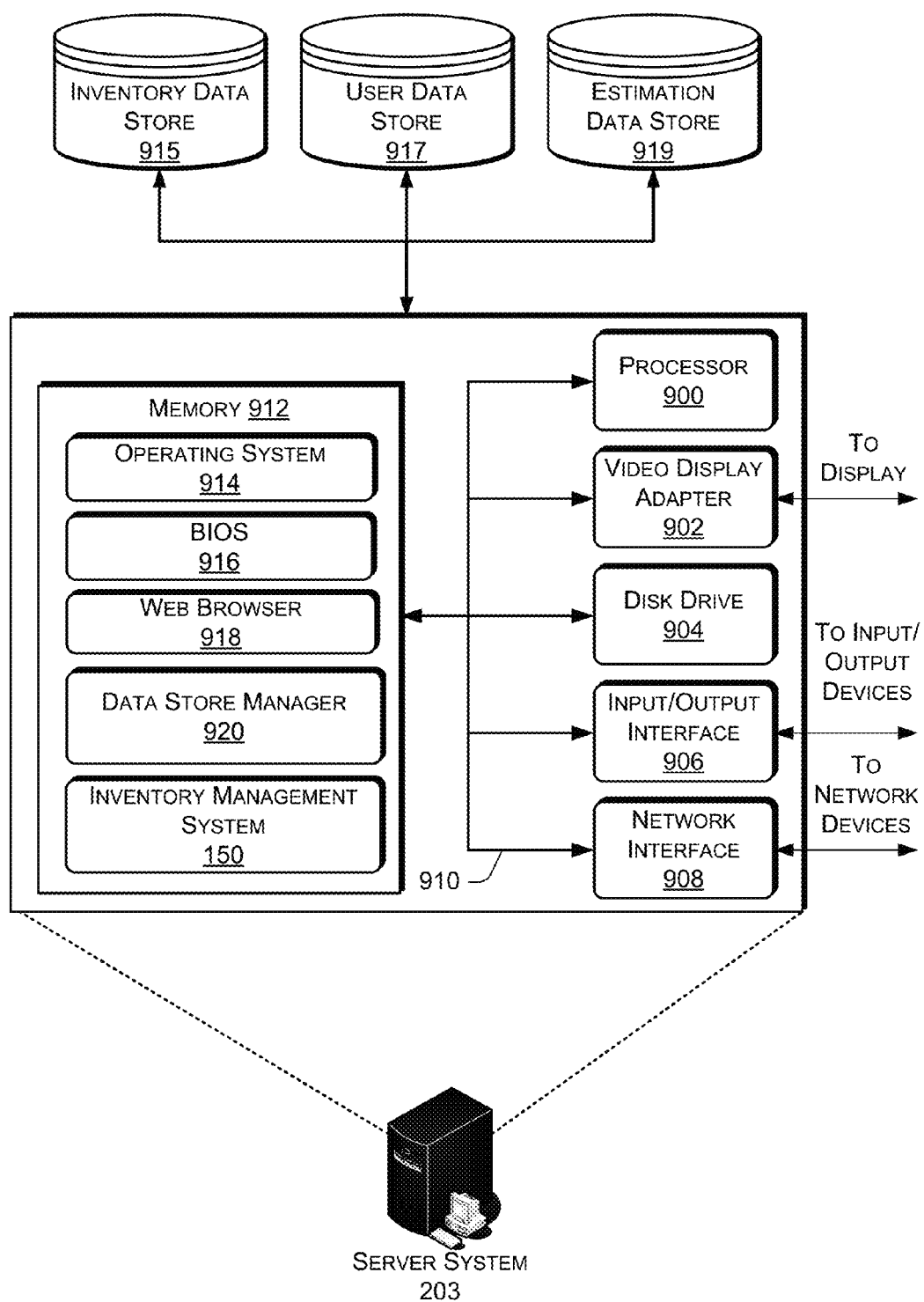
FIG. 9 is a block diagram of an illustrative implementation of a server system that may be used with various implementations, such as the remote computing resources.

FIG. 9 is a pictorial diagram of an illustrative implementation of a server system, such as the remote computing resource 203 that may be used in the implementations described herein. The remote computing resource 203 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 203 to monitor and configure operation of the server system 203. The input/output interface 906 likewise communicates with external input/output devices not shown in FIG. 9, such as a mouse, keyboard, scanner, or other input and output devices that can be operated by an operator of the remote computing resource 203. The network interface 908 includes hardware, software, or any combination thereof, to communicate with other computing devices. For example, the network interface 908 may be configured to provide communications between the server system 203 and other computing devices via the network 202, as shown in FIG. 2.

The memory 912 generally comprises random access memory (RAM), read-only memory (ROM), flash memory, and/or other volatile or permanent memory. The memory 912 is shown storing an operating system 914 for controlling the operation of the server system 203. A basic input/output system (BIOS) 916 for controlling the low-level operation of the server system 203 is also stored in the memory 912.

The memory 912 additionally stores program code and data for providing network services that allow the inventory management system 150 to track items removed from inventory locations, monitor the location of users within the materials handling facility, sequence processing of picked items, determine estimated time until user departure for each user and/or provide notifications to users to provide picked items to drop off locations. The memory 912 may also store a browser application 918. The browser application 918 comprises computer executable instructions that, when executed by the processor 900, generate or otherwise obtain configurable markup documents such as Web pages. The browser application 918 communicates with a data store manager application 920 and/or the inventory management system 150 to facilitate data exchange between the inventory data store 915, the user data store 917 and/or the estimation data store 919.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 203 can include any appropriate hardware and software for integrating with the data stores 915, 917, 919 as needed to execute aspects of the inventory management system 150.

The data stores 915, 917, 919 can include several separate data tables, databases or other data storage mechanisms and media for storing data relating to a particular aspect. For example, the data stores 915, 917, 919 illustrated include mechanisms for inventory information, user information, etc., which can be used to identify an item removed from an inventory location and/or placed into an inventory location.

It should be understood that there can be many other aspects that may be stored in the data stores 915, 917, 919. The data stores 915, 917, 919 are operable, through logic associated therewith, to receive instructions from the remote computing resource 203 and obtain, update or otherwise process data in response thereto.

The memory 912 may also include the inventory management system 150, discussed above. The inventory management system 150 may be executable by the processor 900 to implement one or more of the functions of the remote computing resource 203. In one implementation, the inventory management system 150 may represent instructions embodied in one or more software programs stored in the memory 912. In another implementation, the inventory management system 150 can represent hardware, software instructions, or a combination thereof.

The remote computing resource 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for notifying a user to provide an item to a drop off location, comprising:
    determining that a user is located within a selection area of a materials handling facility, wherein the selection area includes a plurality of items of a similar type that are available for picking by the user;
    determining that the user has picked at least one of the plurality of items;
    associating the picked at least one item with the user;
    determining that the user is departing the selection area of the materials handling facility;
    determining that the user has not provided the picked at least one item to the drop off location for processing; and
    sending a notification for presentation to the user requesting that the user provide the picked at least one item to the drop off location for processing.

2. The computer-implemented method of claim 1, wherein determining that the user is departing the selection area is based at least in part on one or more of: processing an image of the user to determine at least one of a location or a direction of movement of the user, monitoring a position of the user, or determining that the user has picked all items identified on a pick list that are available in the selection area.

3. The computer-implemented method of claim 1, wherein:
    the drop off location is a physical location in the selection area configured to receive picked items and cause the received picked items to be transitioned to a processing area for additional processing; and
    the processing includes at least one of packing the at least one item, assembling the at least one item, gift wrapping the at least one item, preparing the at least one item, weighing the at least one item, or identifying the at least one item.

4. The computer-implemented method of claim 1, wherein:
    associating the at least one item with the user includes associating the at least one item with a tote that is associated with the user;
    wherein the association between the user and the at least one item or the association between the user and the tote are maintained after the user provides the tote to the drop off location; and
    the notification includes a request that the user provide the tote to the drop off location.

5. The computer-implemented method of claim 1, wherein the notification is sent to at least one of an output device within the materials handling facility or a portable device in a possession of the user.

6. The computer-implemented method of claim 1, further comprising:
    determining that the user has provided the at least one item to the drop off location; and
    subsequent to determining that the user has provided the at least one item, maintaining the association between the user and the at least one item.

7. The computer-implemented method of claim 1, wherein the notification is sent to at least one of an output device located within a materials handling facility, an agent located within the materials handling facility, or a portable device in a possession of the user.

8. The computer-implemented method of claim 1, further comprising:
    determining that the user has provided the at least one item to the drop off location;
    subsequent to determining that the user has provided the at least one item to the drop off location, determining that a processing of the at least one item has completed; and
    subsequent to determining that the processing of the at least one item has completed, storing the at least one item in a buffer area until the at least one item is provided to the user.

9. A computing system, comprising:
    one or more processors; and
    a memory coupled to the one or more processors and storing program instructions that when executed by the one or more processors cause the one or more processors to at least:

determine that a user is located within a selection area of a materials handling facility, wherein the selection area includes a plurality of items that are available for picking by the user;

determine that the user has picked at least one of the plurality of items and placed the item in a tote;

determine that a notification that includes a request that the user provide the tote to a drop off location be presented to the user;

send the notification for presentation to the user;

determine that the user has provided the tote to the drop off location; and maintain an association between at least one of the user and the tote or between the user and the item after the user has provided the tote to the drop off location.

10. The computing system of claim 6, wherein:
the tote is associated with the user; and
the item placed in the tote is associated with the tote.

11. The computing system of claim 9, wherein the notification is sent to at least one of an output device located within a materials handling facility, an agent located within the materials handling facility, or a portable device in a possession of the user.

12. The computing system of claim 9, wherein the drop off location is at least one of a stationary location within the materials handling facility configured to receive the tote; a mobile drive unit configured to move within the materials handling facility and receive the tote; or an agent located within the materials handling facility configured to receive the tote.

13. The computing system of claim 9, wherein the notification further includes guidance to assist the user in locating the drop off location.

14. The computing system of claim 9, wherein the determination that the notification that includes a request that the user provide the tote to a drop off location be presented to the user is based at least in part on a determination that the user is leaving the selection area, a determination that a weight of the tote exceeds a threshold, or a determination that at least one picked item be separated from an item that is anticipated to be picked by the user while the user is in the selection area.

15. A computer-implemented method, comprising:
under control of one or more computing systems configured with executable instructions,
determining that a user is located within a selection area of a materials handling facility, wherein the selection area includes a plurality of items that are available for picking by the user;

determining that the user has picked at least one of the plurality of items and placed the item in a tote;

determining that the user has placed the tote at a drop off location; and maintaining an association between at least one of the user and the tote or between the user and the item as the item is processed at a processing area of the materials handling facility.

16. The computer-implemented method of claim 15, further comprising:
determining that the item has been removed from the tote and placed into a second tote;
creating an association between the second tote and the user; and
terminating the association between the user and the tote.

17. The computer-implemented method of claim 16, wherein the second tote includes additional items picked by the user.

18. The computer-implemented method of claim 15, further comprising:
determining that a processing of the item has completed; and
temporarily storing the item in a buffer area until the item is provided to the user as the user transitions from the materials handling facility.

19. The computer-implemented method of claim 18, wherein the processing includes at least one of packing the item, assembling the item, gift wrapping the item, preparing the item, weighing the item, or identifying the item.

20. The computer-implemented method of claim 15, wherein the user places the tote at the drop off location in response to receiving a notification that includes a request that the user place the tote at the drop off location.

21. The computer-implemented method of claim 15, wherein the drop off location is at least one of a stationary location within the materials handling facility configured to receive the tote; a mobile drive unit configured to move within the materials handling facility and receive the tote; or an agent located within the materials handling facility configured to receive the tote.

22. The computer-implemented method of claim 15, further comprising:
providing a notification to the user indicating at least one of: that a processing of the item has completed, or a time by which the processing of the item will be completed.

* * * * *